United States Patent
Neuhauser et al.

(10) Patent No.: US 8,739,828 B2
(45) Date of Patent: Jun. 3, 2014

(54) DOUBLE SEAT VALVE FOR SEPARATING MEDIA

(71) Applicants: Frank Neuhauser, Neresheim (DE); Werner Deger, Kirchheim (DE); Karl Welchner, Deiningen (DE)

(72) Inventors: Frank Neuhauser, Neresheim (DE); Werner Deger, Kirchheim (DE); Karl Welchner, Deiningen (DE)

(73) Assignee: Südmo Holding GmbH (DE)

( * ) Notice: Subject to any disclaimer, the term of this patent is extended or adjusted under 35 U.S.C. 154(b) by 0 days.

(21) Appl. No.: 13/828,175

(22) Filed: Mar. 14, 2013

(65) Prior Publication Data

US 2013/0192690 A1    Aug. 1, 2013

Related U.S. Application Data (63) Continuation of application No. PCT/EP2011/064997, filed on Aug. 31, 2011.

(30) Foreign Application Priority Data

Sep. 14, 2010 (DE) .......................... 10 2010 046 137

(51) Int. Cl.
*F16K 1/44* (2006.01)

(52) U.S. Cl.
USPC ....................................... 137/614.18; 137/312

(58) Field of Classification Search
USPC ................... 137/614.17, 614.18, 312, 240
See application file for complete search history.

(56) References Cited

U.S. PATENT DOCUMENTS

| | | | |
|---|---|---|---|
| 6,009,896 A * | 1/2000 | Van Oosten ............. | 137/614.17 |
| 6,098,645 A * | 8/2000 | Brackelmann et al. .. | 137/614.17 |
| 6,186,163 B1 * | 2/2001 | Borg ......................... | 137/614.18 |
| 7,530,368 B2 | 5/2009 | Deger | |
| 7,891,376 B2 | 2/2011 | Neuhauser et al. | |
| 8,327,881 B2 * | 12/2012 | Norton ..................... | 137/614.18 |
| 2010/0072411 A1 | 3/2010 | Norton | |
| 2011/0197985 A1 | 8/2011 | Fontenit et al. | |

FOREIGN PATENT DOCUMENTS

| | | |
|---|---|---|
| DE | 102005057103 A1 | 5/2007 |
| DE | 102007038124 A1 | 2/2009 |
| EP | 2357386 A1 | 8/2011 |
| JP | 5754564 A | 9/1982 |

OTHER PUBLICATIONS

International Search Report Application No. PCT/EP2011/064997 Completed: Nov. 22, 2011; Mailing Date: Dec. 1, 2011 2 pages.
International Preliminary Report on Patentability and Written Opinion of the International Searching Authority Application No. PCT/EP2011/064997 Completed: Mar. 19, 2013 6 pages.

* cited by examiner

*Primary Examiner* — Kevin Lee
(74) *Attorney, Agent, or Firm* — St. Onge Steward Johnston & Reens LLC (57) ABSTRACT

A double seat valve for separating media includes a housing having a first connector for a first pipeline and a second connector for a second pipeline, a first closing member of the first connector and a first closing member seat assigned thereto, the first closing member in closed position cooperating in sealing manner with the first closing member seat via at least one sealing element, a second closing member of the second connector axially spaced from the first closing member, and a second closing member seat assigned to the second closing member, the second closing member in closed position cooperating in sealing manner with the second closing member seat via at least one sealing element. The two closing members can be lifted independently of one another from their respective closing member seats. A leakage space is also provided between the two closing members and discharges into a leakage outlet.

16 Claims, 7 Drawing Sheets

DOUBLE SEAT VALVE FOR SEPARATING MEDIA

CROSS REFERENCES TO RELATED APPLICATIONS

This application is a continuation of international patent application PCT/EP2011/064997, filed on Aug. 31, 2011 and designating the U.S., which international patent application has been published in German language and claims priority from German patent application No. 10 2010 046 137.7, filed on Sep. 14, 2010. The entire contents of these priority applications are incorporated herein by reference.

BACKGROUND OF THE INVENTION

The invention generally relates to double seat valves used for separating media. More specifically, the invention relates to a type of a double seat valve, which comprises a valve housing, which has connectors for a first pipeline and a second pipeline, a first closing member and a first closing member seat assigned thereto, wherein the first closing member in its closed position cooperates in a sealing manner with the first closing member seat via at least one sealing element, and comprising a second closing member axially spaced from the first closing member, and a second closing member seat assigned to said second closing member, wherein the second closing member in its closed position cooperates in a sealing manner with the second closing member seat via at least one sealing element, wherein the two closing members can be lifted independently of one another from their respective closing member seat, wherein a leakage space is provided between the two closing members and discharges into a leakage outlet.

Double seat valves of the above-mentioned type are used for example in the food processing industry in product-conveying processing systems.

With double seat valves of this type, there are high requirements on the reliable separation of the media conveyed through the at least two pipelines. The two closing members in their closed position separate the two connectors tightly with respect to one another on the inner side of the housing, and in the common open position of the two closing members the pipelines connected to the two connectors can communicate with one another via the housing interior.

A further fundamental requirement of such double seat valves lies in the fact that the closing members, including their closing member seats and the leakage space located between the closing members, can be thoroughly cleaned.

In order to avoid the need to switch off all processes in a processing system, in which such a double seat valve is used, for the purpose of cleaning the closing members, the closing members seats and the leakage space, which would reduce the productivity of such a processing system, it is desirable if the cleaning process is carried out for example via one of the two pipelines, whereas a product process continues in the other pipeline. For this purpose, the two closing members can be lifted independently of one another from their closing member seat. The term "lift" is to be understood with such double seat valves to mean that one of the two closing members is moved far enough from its closing member seat by a short stroke that there is no longer any sealing contact between the sealing element of this closing member and the associated closing member seat. Here, the other closing member remains in sealed contact with its closing member seat. A cleaning medium, normally a cleaning liquid, can then be fed into the leakage space through the pipeline and the connector to which the lifted closing member is assigned, via the gap between the closing member and the associated closing member seat, such that the cleaning medium thoroughly rinses the closing member seat of the lifted closing member and the sealing element thereof and the leakage space. The cleaning medium supplied through the connector associated with the lifted closing member is normally under a very high pressure during this process, which may sometimes be 10 bar or more.

The cleaning medium runs via the leakage space to the leakage outlet and, from here, into the surrounding environment of the double seat valve.

Document DE 10 2005 057 103 A1 describes the problem that, when feeding the cleaning medium, no additional overpressure may form in the leakage space in accordance with the provisions of more recent standards, said additional overpressure, in the extreme case, possibly causing the other closing member located in the closed position to be moved away from its closing member seat, such that cleaning medium could enter the other pipeline, in which a product process is currently being carried out.

To solve this problem, it is proposed in that document to provide a closing member with an inclined drainage portion, of which the total opening cross section is at least approximately as large as the opening cross section of the larger of the two connectors. The problem of an overpressure build-up in the leakage space as a result of an excessively low discharge of cleaning medium from the leakage space during the cleaning process is thus avoided, wherein the leakage outlet has a passage cross section corresponding to the cross section of the leakage space in order to satisfy this provision.

However, only the problem of avoiding an overpressure in the leakage space is solved thereby. A further provision of more recent standards is that, when the leakage space is impinged after lifting of one of the two closing members, the at least one sealing element or the closing member seat of the other closing member, which is located in its closed position, is not impinged directly by cleaning medium, because cleaning medium could then also enter the other pipeline, because the cleaning medium as already mentioned is under a high pressure. With the previously mentioned known double seat valve, this provision is not satisfied. If, for example, the lower closing member of the known double seat valve is lifted, and if pressurized cleaning medium is fed into the leakage space in the gap between the closing member and the closing member seat thereof, the cleaning medium, due to its substantially axial direction of flow, initially contacts the closing member seat and the sealing element of the upper closing member located in the closed position, whereby cleaning medium could flow past the sealing element of the upper closing member and infiltrate the valve housing region, through which a product medium currently flows.

The above-mentioned problem is overcome in the case of the double seat valve known from document DE 10 2007 038 124 A1, by a flow barrier element, which, when one closing member is lifted and as the leakage space is impinged by cleaning medium, shadows the at least one sealing element and/or the closing member seat of the other closing member, which is located in its closed position, against direct impingement by the cleaning medium entering the leakage space. The flow barrier element thus prevents the cleaning medium, as it enters the leakage space, from directly impinging the seal and/or the closing member seat of the other closing member located in its closed position.

Various embodiments of the flow barrier element are disclosed in the cited document. In all these embodiments cited in said document of the flow barrier element, it is necessary for the leakage outlet adjoining the leakage space to have at least the same cross section as the leakage space in order to satisfy the provision already mentioned above, in accordance with which no pressure may build up in the leakage space. However, this has the disadvantage that the leakage outlet pipe adjoining the leakage space has to have an accordingly large diameter and therefore a wall with a large circumference. This leads to a greater material outlay and therefore to greater initial costs of the known double seat valve.

SUMMARY OF THE INVENTION

It is an object of the present invention to develop a double seat valve to the extent that the above-mentioned provisions of avoiding an overpressure build-up in the leakage space as well as the direct impingement of the seal and/or of the closing member seat of the closing member located in its closed position when the other closing member is lifted, with simultaneous cost saving can be satisfied.

According to an aspect, a double seat valve for separating media is provided, comprising a valve housing having connectors for a first pipeline and a second pipeline; a first closing member, a first closing member seat, and at least one first sealing element; a second closing member axially spaced from the first closing member, a second closing member seat axially spaced from the first closing member seat, and at least one second sealing element; the first and second closing members being able to be lifted independently of one another from the first and second closing member seats, a leakage space arranged between the first and second closing members and discharging into a leakage outlet; a flow barrier element arranged between the first and second closing members for shadowing, when the first closing member is lifted, at least one of the second sealing element and the second closing member seat against direct impingement by a medium fed into the leakage space, and for shadowing, when the second closing member is lifted, at least one of the first sealing element and the first closing member seat against direct impingement by a medium fed into the leakage space; the flow barrier element having an annular body, which divides, when one of the first and second closing members is lifted, together with said one of the first and second closing members the leakage space into a first leakage space portion and a second leakage space portion, the annular body being configured for a passage of medium through the annular body from the first leakage space portion into the second leakage space portion such that a second pressure in the second leakage space portion is reduced compared to a first pressure in the first leakage space portion, the medium reaching the leakage outlet from the second leakage space portion.

The double seat valve according to the invention satisfies both the provision of avoiding direct impingement of the seal and/or of the closing member seat of the closing member located in its closed position when the other closing member is lifted and also of avoiding an overpressure build-up in the leakage space as a result of a development of the flow barrier element. This is implemented with the double seat valve according to the invention in that the annular body, in the lifted position of one of the two closing members, together with that closing member divides the leakage space into a first leakage space portion and a second leakage space portion, which communicate with one another in such a way that medium can pass through the annular body from the first leakage space portion into the second leakage space portion with a drop in pressure. The medium can then flow substantially with no pressure to the leakage outlet. The closing member located in its closed position is located here in the second leakage space portion and is thus protected completely against a passing of cleaning medium past its seal and into the product-conveying valve housing.

With the double seat valve according to the invention, the flow barrier element thus has two functions in order to satisfy the two above-mentioned provisions. When one closing member is lifted, the cleaning medium enters the first leakage space portion at high pressure and then reaches the inner leakage space portion with a reduction of pressure and a reduction of flow rate, from where it reaches the leakage outlet. This then has the significant advantage that the leakage outlet only requires a much smaller cross section than the cross section of the leakage space itself. The leakage outlet pipe can thus be formed with a much smaller diameter, which saves material and therefore initial costs.

So that the medium can pass through the annular body, the annular body of the flow barrier element of the double seat valve according to the invention has passage regions, which preferably give the medium a direction of flow that, where possible, points directly in the direction of the leakage outlet. Here, the passage regions cause a throttling of the medium.

In a preferred refinement, when medium passes from the first leakage space portion, the pressure in the second leakage space portion reduces substantially to atmospheric pressure at the leakage outlet or even to a pressure below the atmospheric pressure.

The provision of avoiding an overpressure in the leakage space is satisfied most efficiently in this embodiment.

In a further preferred refinement, the annular body of the flow barrier element has a radially extending annular body portion and an adjoining axially extending annular body portion, wherein, when one of the closing members is lifted and the first leakage space portion is impinged by medium, the axial annular body portion contacts said closing member in a sealing manner.

In this refinement, the annular body of the flow barrier element is at least L-shaped, but preferably T-shaped, in section parallel to the longitudinal direction of the double seat valve, since an axially extending annular body portion extends away from the radial annular body portion on either side thereof. The radial annular body portion, together with the axial annular body portion, the lifted closing member and the leakage space housing wall, forms the first leakage space portion such that, in this embodiment, the first leakage space portion is located radially outside the second leakage space portion. Here, the radial annular body portion preferably takes on the function of blocking the seal or the closing member seat of the closing member located in the closed position, and the axial annular body portion takes on the function of ensuring the flow-through of the medium into the second leakage space portion.

When one of the closing members is lifted, the axial annular body portion preferably only comes into contact with that closing member in a sealing manner when the first leakage space portion is impinged by medium.

This has the advantage that, in the operating state of the double seat valve, in which both closing members are in their closed position, leakages cannot only pass through the annular body into the second leakage space portion, but also via the "leak" between the axial annular body portion and the respective closing member, whereby leakage identification is also improved with the double seat valve according to the invention.

In conjunction with the previously mentioned refinement, it is also preferable for the axial annular body portion and the closing member to have edges engaging one another from behind, via which the axial annular body portion contacts the closing member in a sealing manner.

In this case, the sealing contact between the axial annular body portion and the lifted closing member is ensured in a simple manner when one closing member is lifted, and the flow barrier element in this operating state is also held or locked on the lifted closing member in a predetermined position relative thereto, such that, when feeding pressurized medium into the first leakage space portion, the flow barrier element is not pushed away in an undesired manner to such an extent that the sealing contact between the axial annular body portion and the lifted closing member is cancelled.

In a further preferred refinement, the flow barrier element is arranged loosely between the closing members and axially movably relative thereto.

The axial movability of the flow barrier element relative to the two closing members has the advantage that the housing region of the leakage space, where the flow barrier element is located, is also easily accessible for cleaning. The loose arrangement of the flow barrier element between the closing members means that the flow barrier element is not rigidly connected to either of the two closing members and, for improved cleaning, can therefore be moved away axially slightly from its original position in the closed state of both closing members when a pressurized cleaning medium is fed.

In a further preferred refinement, the annular body of the flow barrier element has a plurality of apertures, through which the medium can pass from the first leakage space portion into the second leakage space portion, wherein the number and/or individual cross section of the apertures is dimensioned such that the pressure in the second leakage space portion is substantially at atmospheric pressure or therebelow when medium passes through the apertures.

In this preferred refinement of the flow barrier element, the annular body of said flow barrier element has a plurality of apertures as passage regions. Such apertures in the form of small holes cause a strong acceleration of the medium when said medium passes through, such that the medium exiting from the apertures causes a suction effect in the second leakage space portion in the manner of a water aspirator, whereby a pressure build-up in the second leakage space portion is in any case avoided. On the contrary, with a corresponding configuration of the apertures, it is possible to generate a negative pressure in the second leakage space portion. Three such apertures can be provided in each case in the annular body of the flow barrier element, for example distributed in the circumferential direction over the longitudinal axis of the double seat valve, more specifically three apertures for the lifting of one of the closing member and the other three apertures for the lifting of the other closing member. For example, the apertures may have an individual diameter from approximately 1 to 5 mm. Such small apertures have the advantage that, with corresponding orientation thereof, the medium passing through can be given a direction that leads directly into the leakage outlet and thus avoids a spraying of the medium in the leakage space, which may give rise to an impaired drainage of the medium from the leakage space and therefore to a pressure build-up.

In a further preferred refinement, the leakage space is connected to the leakage outlet via one or more drainage openings in one of the two closing members, and the apertures in the annular body are aligned with the one or more drainage openings.

In this case, it is advantageous for the medium passing through the apertures to be directed directly to the drainage openings. Since the medium has a high flow velocity as it passes through the apertures, contact between the medium jets and wall portions of the housing or other parts is thus avoided, which could lead disadvantageously to a spraying of the medium in the leakage space and therefore possibly to an impingement of the seal and/or of the closing member seat of the closing member located in the closed position, which is to be avoided.

In addition, the apertures are aligned with one another such that the virtual extensions of the apertures do not intersect before the drainage openings, and therefore a meeting of the medium jets passing through the apertures is also avoided, which likewise may lead to a spraying of medium in the leakage space.

In a further preferred refinement, the one or more drainage openings widen toward the leakage space.

In this case, the advantage is achieved that the ends of the drainage openings on the side of the leakage space do not form baffles, against which the medium jets passing through the apertures contact perpendicularly. Rather, a particularly streamlined profile of the drainage openings is created as a result of the shape of the drainage openings, which is widened on the leakage space side and therefore rounded.

In a further preferred refinement, the flow barrier element is arranged between the closing members in a manner secured against rotation.

This measure is advantageous in particular with the previously mentioned measures, in accordance with which the annular body has a plurality of apertures, which are aligned with one or more drainage openings. Since the flow barrier element is secured against rotation, this alignment between the apertures in the annular body and the drainage openings is reliably maintained during operation of the double seat valve.

In a further preferred refinement, the flow barrier element bears against the housing on the housing side via a seal or a sliding element.

Here, a seal has the advantage that the first leakage space portion, with the exception of the desired passage of medium through the annular body of the flow barrier element, is sealed even at high pressures with respect to the second leakage space portion. By contrast, a sliding element in particular in conjunction with the loose arrangement of the flow barrier element between the two closing members has the advantage that the flow barrier element is slightly axially movable, and the flow barrier element cannot be axially blocked.

Alternatively to the previously mentioned refinements, it is also possible however for the flow barrier element to bear directly against the housing without an additional seal or sliding element.

This refinement has the advantage that the flow barrier element can be produced particularly cost-effectively, because an additional seal or an additional sliding element is omitted. In this case, the flow barrier element or the annular body thereof may be provided on the radially outer side with a bead or projection that bears against the housing. This embodiment is then suitable in particular when the flow barrier element is manufactured from a plastics material.

In a further preferred refinement, the annular body of the flow barrier element is not in contact in a sealing manner with either of the closing members in the closed position of both closing members.

This measure has the advantage that the flow barrier element in the closed position of both closing members does not hinder leakage identification, that is to say in the event of a leak of at least one of the sealing elements of the two closing members, a leakage can be detected in spite of the presence of the flow barrier element since the leakage can infiltrate the leakage space between the respective closing member and the flow barrier element, which can then be determined either by the exit of the leakage from the leakage outlet or by corresponding detectors.

In a further preferred refinement, at least the annular body of the flow barrier element is manufactured from a plastics material, in particular PEEK.

The advantage of this measure lies on the one hand in the fact that the flow barrier element can likewise be produced cost-effectively, and on the other hand, in conjunction with one of the above-mentioned embodiments, in accordance with which the axial annular body portion and the closing member have edges that can engage one another from behind, in the fact that a plastics material is advantageous for reasons of easier assembly of the double seat valve, since the corresponding edge of one or both axial annular body portions of the annular body of the flow barrier element can be connected to the respective closing member by being clicked into place.

Further advantages and features will emerge from the following description and the accompanying drawing.

It goes without saying that the above-mentioned features and the features yet to be explained hereinafter can be used not only in the respective combinations specified, but also in other combinations or in isolation, without departing from the scope of the present invention.

BRIEF DESCRIPTION OF THE DRAWINGS

An exemplary embodiment of the invention is illustrated in the drawing and will be described in greater detail with reference to said drawing, in which.

DESCRIPTION OF AN EXEMPLARY EMBODIMENT

Figure 1:
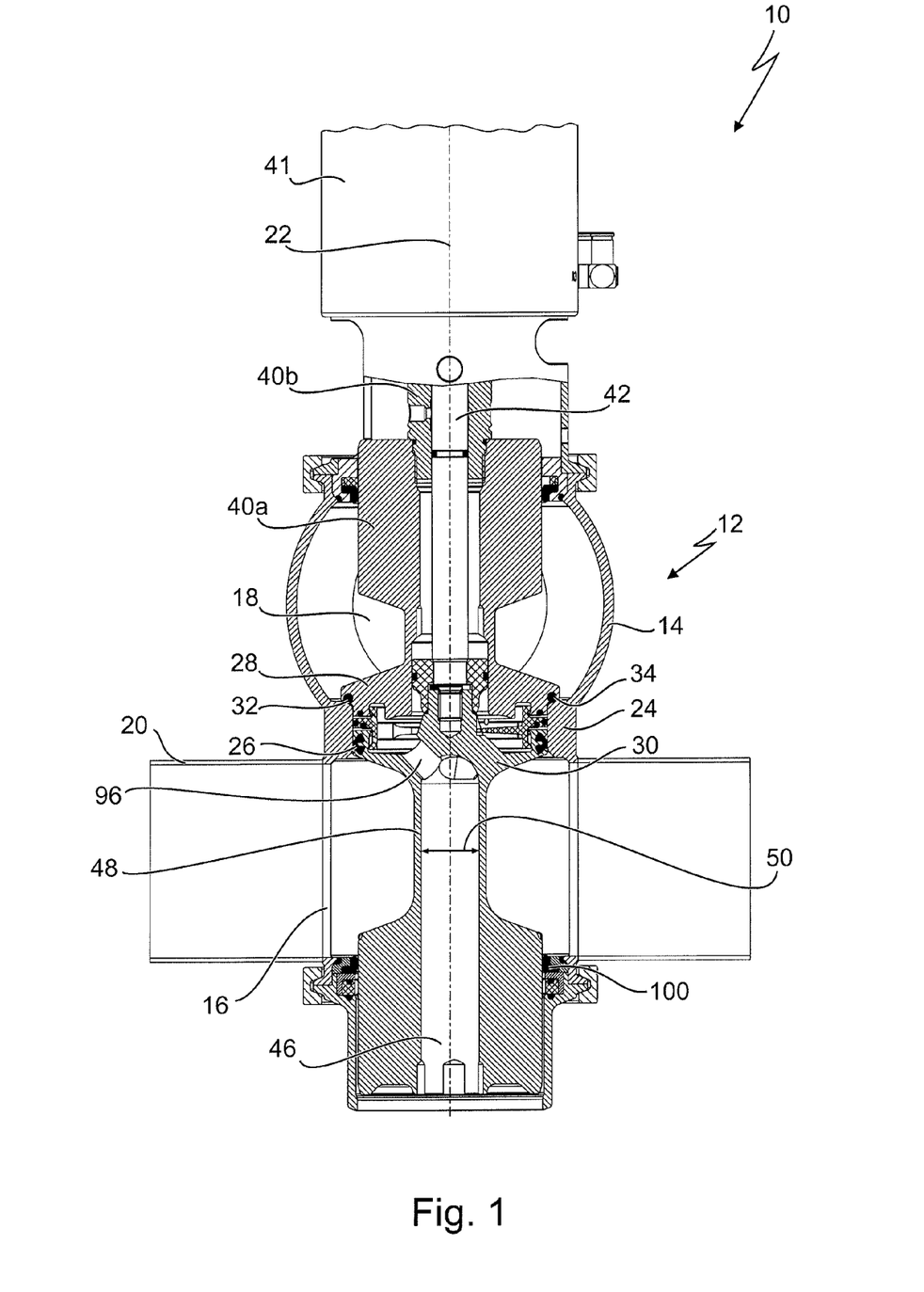
FIG. 1 shows a detail of a double seat valve in longitudinal section, wherein the double seat valve is shown in the closed position.

A double seat valve, provided with the general reference sign 10, for separating incompatible media is illustrated in FIG. 1. Further details of the double seat valve 10 and its operating principle are illustrated in FIGS. 2 to 8.

The double seat valve 10 is used for example in a food processing system.

The double seat valve 10 has a valve housing 12, which has a first valve housing portion 14 and a second valve housing portion 16. A first connector 18 for connecting a first pipeline (not illustrated) to the double seat valve 10 is arranged on the first valve housing portion 14, and a second connector 20 for connecting a further pipeline (not illustrated) to the double seat valve 10 is arranged on the second valve housing portion 16, wherein the connectors 18 and 20 in the exemplary embodiment shown are arranged offset from one another by 90° with respect to a longitudinal center axis 22 of the double seat valve 10. In the present description, the longitudinal center axis 22 defines the axial direction of the double seat valve 10 and parts thereof.

Figure 3:
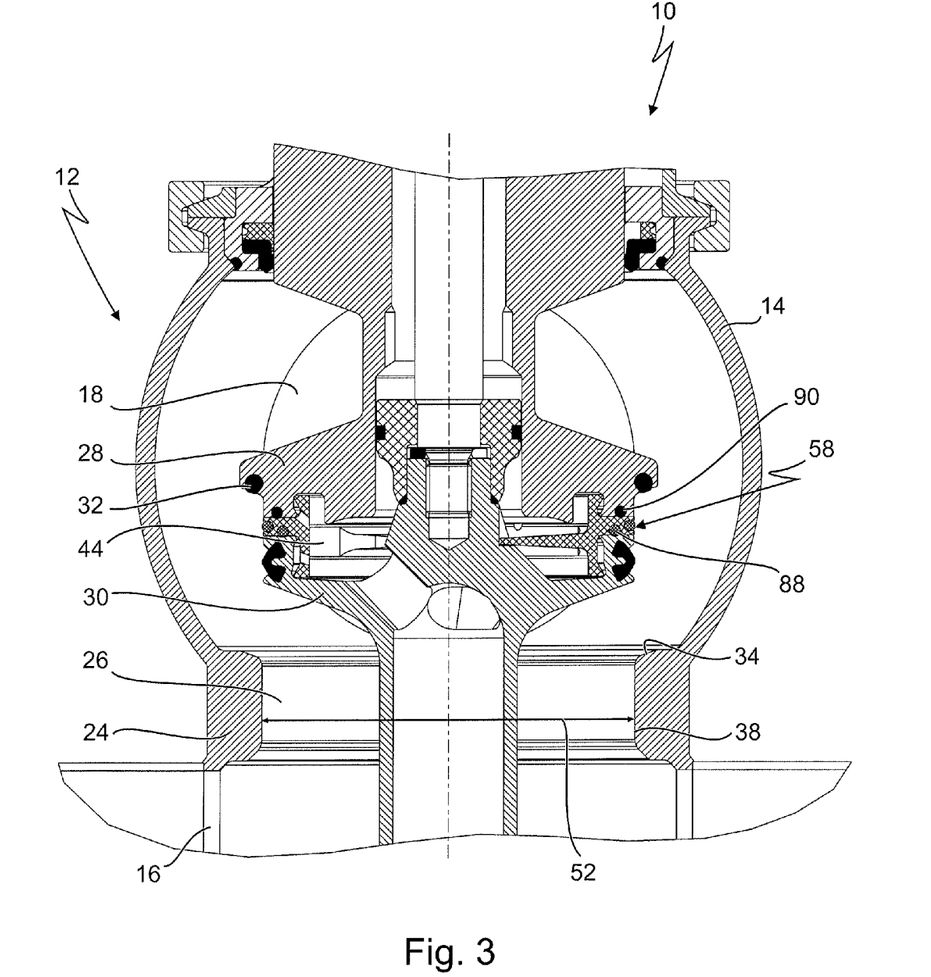
FIG. 3 shows a detail of the double seat valve in FIG. 1 in the region of its closing members, wherein the double seat valve is shown in its open position.

Between the first valve housing portion 14 and the second valve housing portion 16, the valve housing 12 has a valve housing portion 24, which internally defines a connection opening 26, via which the interiors of the valve housing portions 14 and 16 communicate with one another in the open state of the double seat valve 10, as is illustrated in FIG. 3.

A first closing member 28 and a second closing member 30 are arranged in the valve housing 12. The first closing member 28 has a sealing element 32, which contacts a first closing member seat 34 in a sealing manner in the closed position of the closing member 28 according to FIGS. 1 and 2, wherein the first closing member seat 34 is arranged at an upper end of the connection portion 24 of the valve housing 12. The second closing member 30 likewise has a sealing element 36, which contacts a second closing member seat 38 in a sealing manner when the second closing member 30 is located in its closed position, as is illustrated in FIGS. 1 and 2.

The first closing member 28 is connected to a driving body 40a, 40b, wherein the driving body 40a, 40b is connected to a control mechanism 41 (not illustrated in greater detail and known per se) to axially move the closing member 28. The second closing member 30 is likewise connected to a driving body 42, which is connected to the control mechanism 41 to axially move the closing member 30.

Figure 2:
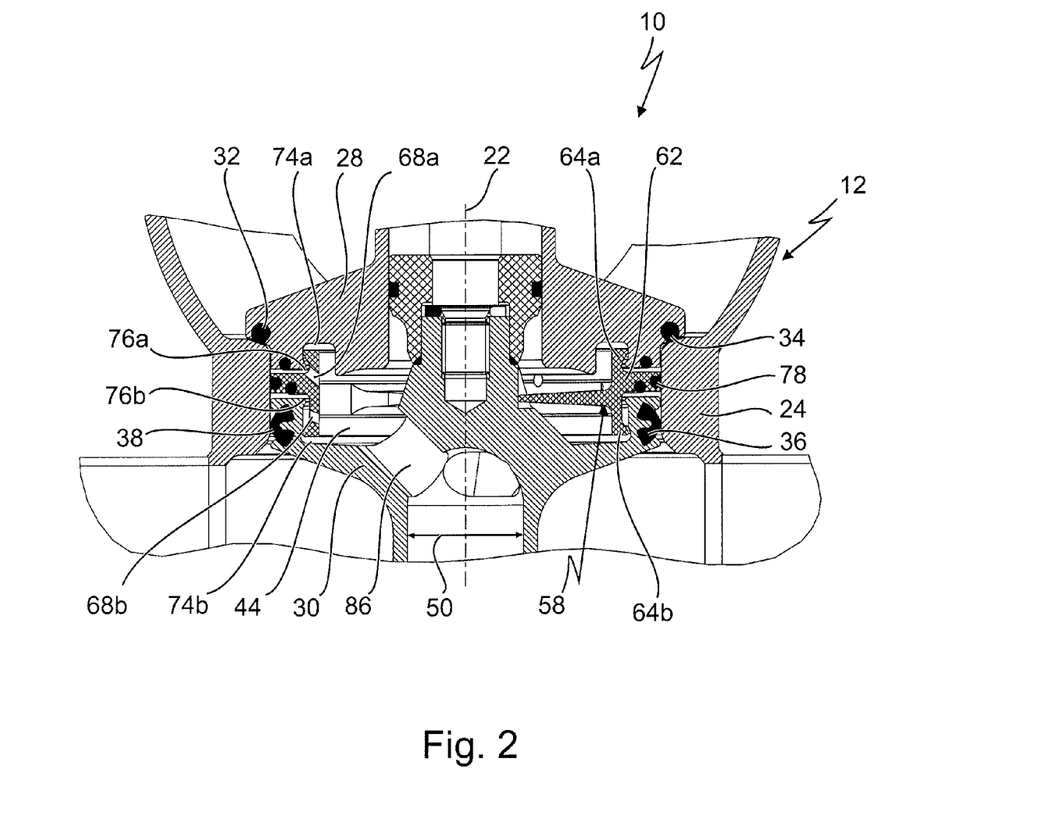
FIG. 2 shows a detail of the double seat valve in FIG. 1 in the region of its two closing members, enlarged compared to FIG. 1.

A leakage space 44, which in the closed state of the double seat valve 10 according to FIGS. 1 and 2 is used to enable a drainage of leakages in the event of a leak of one or both of the sealing elements 32, 36, is located between the first closing member 28 and the second closing member 30 in order to detect a leakage state. To this end, the leakage space 44 is connected to a leakage outlet 46. The leakage outlet 46 is formed by a tubular continuation of the second closing member 30.

As is clear from FIG. 1, the leakage outlet 46 has a passage cross section 50, which is smaller than a cross section 52 of the connection opening 26 in the connection portion 24 of the housing 12. The passage cross section 50 is likewise smaller than the cross section of the leakage space 44, which corresponds substantially to the cross section 52 of the connection opening 26.

FIG. 1 shows the closing members 28 and 30 in their common closed position, in which the interior of the valve housing portion 14 is sealed off in a hermetically tight manner from the interior of the valve housing portion 16.

FIG. 3 shows both closing members 28 and 30 in their common open position, in which the closing members 28 and 30 are moved axially upwardly from their respective closing member seat 34, 38 by corresponding actuation of the control mechanism 41 by means of the driving bodies 40a, 40b and 42, such that the connection opening 26 between the valve housing portions 14 and 16 is open. In this case, a product medium for example can be transferred from the connector 18 into the connector 20.

Additionally to the operating states shown in FIG. 1 or 2 and 3, the double seat valve 10 additionally has two further operating states, which are referred to as "lifting" of a respective one of the two closing members 28 or 30.

Figure 7:
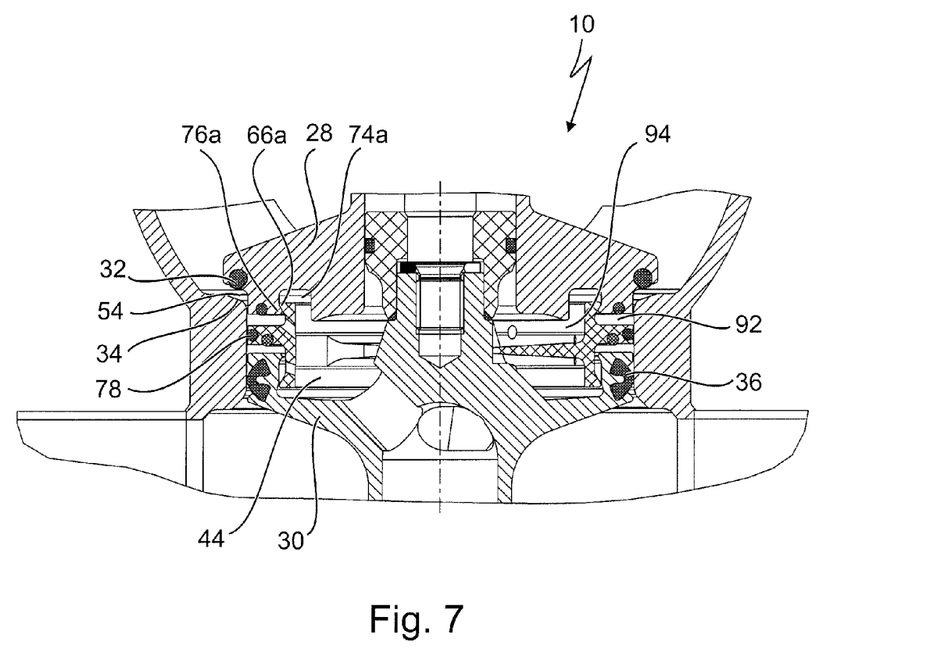
FIG. 7 shows a detail of the double seat valve in FIG. 1 in the region of its two closing members, wherein one of the two closing members is lifted.
Figure 8:
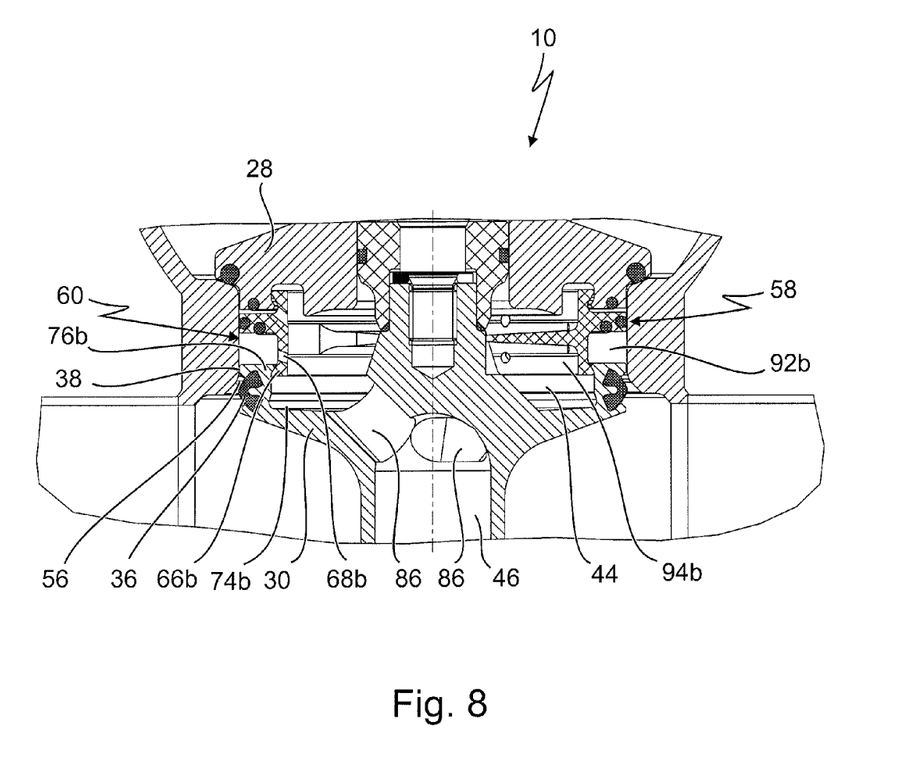
FIG. 8 shows a detail of the double seat valve in FIG. 1 in the region of its closing members, wherein the other closing member is lifted.

The two operating states of lifting are illustrated in FIGS. 7 and 8.

The lifting of the first closing members 28 is shown in FIG. 7, that is to say the first closing member 28 is lifted axially far enough from its closing member seat 34 that the sealing element 32 is brought out of contact with the closing member seat 34. By contrast, the second closing member 30 is still located in its closed position, as is shown in FIG. 7.

FIG. 8 shows the lifting of the second closing member 30, wherein the second closing member 30 in accordance with FIG. 8 is removed axially downwardly by a lifting stroke, more specifically exactly until the sealing element 36 is brought out of contact with the associated closing member seat 38. During lifting of the second closing member 30, the first closing member 28 remains in its closed position, as is clear from FIG. 8.

The lifting of the first closing member 28 in accordance with FIG. 7 is used to feed a cleaning medium into the leakage space 44 through a gap 54 between the closing member 28 and the closing member seat 34. Here, the cleaning medium is supplied via the connector 18 and the pipeline connected thereto. In particular, the sealing element 32 and the closing member seat 34 and also the interior of the leakage space 44 are cleaned thoroughly by the cleaning medium. Here, the supplied cleaning medium is normally under a high pressure, which may sometimes be 10 bar or more.

During lifting of the second closing member 30, a pressurized cleaning medium is supplied via the connector 20 and the pipeline connected thereto, and is supplied into the leakage space 44 via a gap 56 between the closing member 30 and the closing member seat 38.

In both cases according to FIGS. 7 and 8, it must be ensured that the respective sealing element (sealing element 36 in FIG. 7 and sealing element 32 in FIG. 8) and/or the associated closing member seat 34 or 38, which contact one another in a sealing manner, are not impinged by the fed cleaning medium in such a way that the cleaning medium infiltrates between the sealing element 32 or 36 and associated closing member seat 34 and 38, which are contacted in a sealing manner, and into the respective other valve housing portion 14 or 16. It is thus ensured as a result of the respective valve housing portion 14 or 16, of which the associated closing member 28 or 30 is located in its closed position, that a produce process can proceed without contamination of the product medium by the cleaning medium.

Besides the above-mentioned requirement, in accordance with which, during lifting of one closing member 28 or 30, the sealing element 32 or 36 and/or the closing member seat 34 or 38 of the other closing member 28 or 30 is not impinged directly by cleaning medium, there is a further requirement that the cleaning medium in the leakage space 44 must not cause a pressure build-up, and instead the cleaning medium has to be conveyed away to the leakage outlet 46 with minimal pressure.

Both above-mentioned requirements are ensured with the double seat valve 10 by a flow barrier element 58, which is arranged in the leakage space 44 between the first closing member 28 and the second closing member 30.

The flow barrier element 58 will be described in greater detail first, with reference to FIGS. 4 and 5.

The flow barrier element 58 has an annular body 60 extending over the entire circumference (with respect to the longitudinal axis 22). The annular body 60 has a radially extending and radially outer annular body portion 62 and a radially inwardly adjoining and axially extending annular body portion 64*a*, 64*b*, which each likewise extend over the entire circumference (with respect to the longitudinal axis 22). The axial annular body portion 64*a* and the axial annular body portion 64*b* each have an edge 66*a* and 66*b* respectively, which extend over the entire circumference and form a protruding annular flange pointing radially outwardly.

A plurality of apertures 68*a*, in the exemplary embodiment shown three apertures distributed over the circumference, are formed in the axial annular body portion 64*a*, wherein the apertures 68*a* are oriented at an incline with respect to the horizontal.

Figure 4:
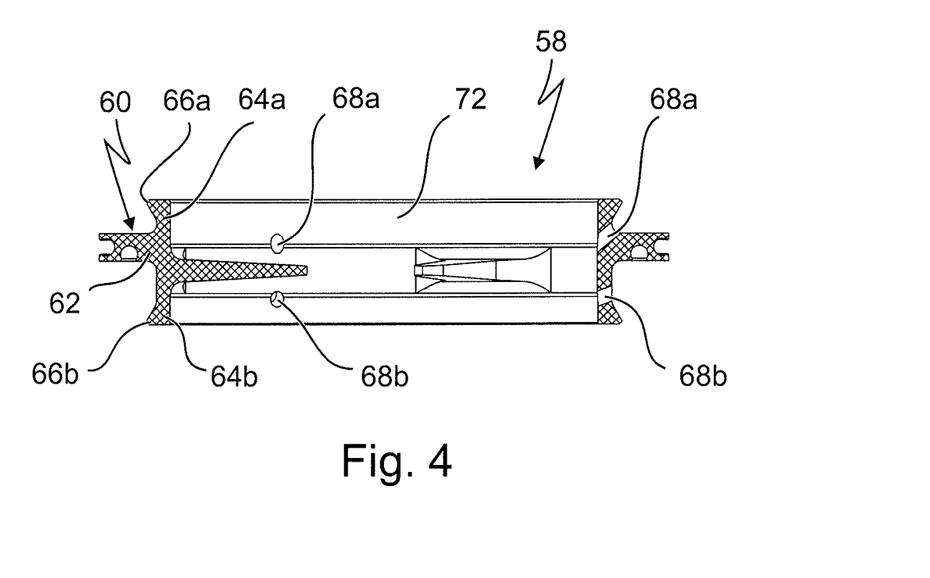
FIG. 4 shows a longitudinal sectional view of a flow barrier element of the double seat valve in FIG. 1 in isolation.
Figure 5:
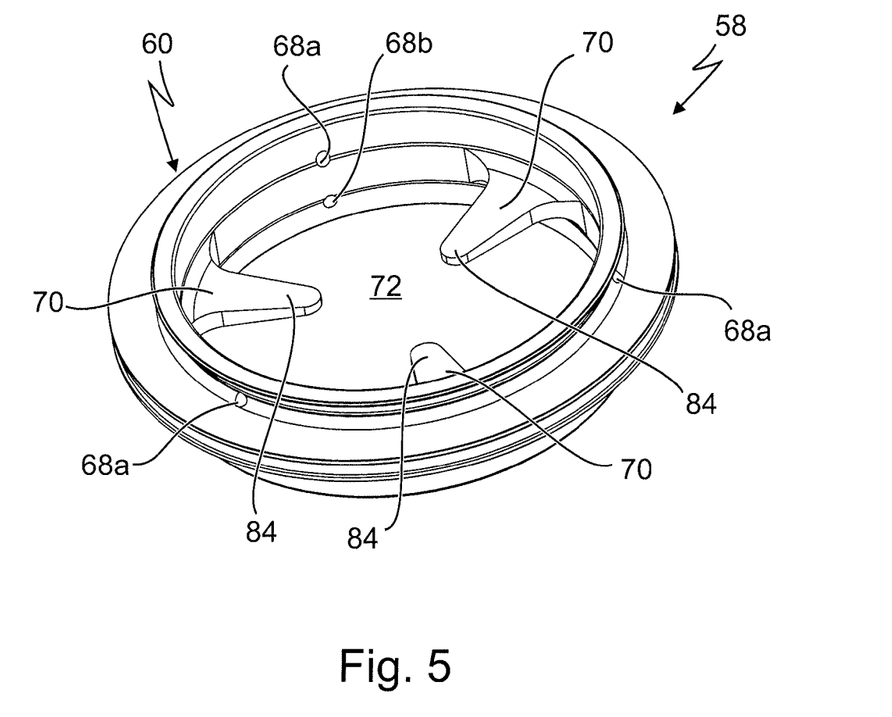
FIG. 5 shows a perspective illustration of the flow barrier element in FIG. 4.

A plurality of apertures 68*b*, in this case three apertures, are likewise formed in the axial annular body portion 64*b*, only one of said apertures being shown in each of FIGS. 4 and 5, said apertures likewise being directed at an incline with respect to the horizontal, but with a smaller incline than the apertures 68*a*.

A plurality of fingers 70, in this case three fingers, which extend pointing radially inwardly toward the longitudinal centre axis of the flow barrier element 58, but end before the longitudinal centre axis, extend radially inwardly from the annular body 60. In addition, an interior 72 of the flow barrier element 58 is open on both sides in the axial direction.

The flow barrier element 58 is manufactured in one piece on the whole from a plastics material, in this case from PEEK.

The installed position of the flow barrier element 58 in the double seat valve 10 will be described hereinafter with reference inter alia to FIG. 2.

The first closing member 28 has a recess 74*a*, which extends over the entire circumference with respect to the longitudinal axis 22 and in which the axial annular body portion 64*a* of the flow barrier element 58 engages. Accordingly, the closing member 30 has a recess 74*b*, in which the axial annular body portion 64*b* of the flow barrier element 58 engages.

The recess 74*a* has a radially outer edge 76*a*, which protrudes radially inwardly and extends over the entire circumference about the longitudinal axis 22. The recess 74*b* in the closing member 30 likewise radially outwardly has a radially inwardly protruding edge 76*b*, which extends over the entire circumference about the longitudinal axis 22.

The diameters of the edges 76*a* and 76*b* are slightly smaller than the diameters of the edges 66*a*, 66*b* of the flow barrier element 58, and therefore the edges 66*a*, 66*b* and the edges 76*a*, 76*b* engage one another from behind. Since the flow barrier element 58 is manufactured from plastics material, the flow barrier element 58 is clicked into the corresponding recesses 74*a*, 74*b* during assembly of the double seat valve 10, and therefore the axial annular body portions 64*a*, 64*b* are trapped in the recesses 74*a*, 74*b* and can only be removed again from the closing members 28 and 30 with an application of force. To this end, forces that correspond to a pressure of at least 13 bar are necessary.

The flow barrier element 58 is arranged loosely between the two closing members 28 and 30 and axially movably relative thereto. As is clear from FIG. 2, the axial depth of the recesses 74*a* and 74*b* is accordingly dimensioned at least as large as the axial extension of the axial annular body portions 64*a* and 64*b* so that the axial annular body portions 64*a* and 64*b* can move axially in the recesses 74*a* and 74*b*.

The radial annular body portion 62 of the flow barrier element 58 has such a diameter that it bears against the inner wall of the connection portion 24 of the housing 12. In the exemplary embodiment shown, the radial annular body portion 62 is provided with a radial seal 78, which bears in a sealing manner against the inner wall of the connection portion 24 (apart from in the open position according to FIG. 3). The seal 78 can also be omitted however, wherein the radial annular body portion 62 then preferably ends radially outwardly in a bead or a sealing lip, and the bead or the sealing lip then bears against the inner wall of the connection portion 24. Furthermore, it is possible to provide a sliding element instead of a seal at the radially outer edge of the radial annular body portion 62.

Before discussing further details of the flow barrier element 58, its installed position and its function, the second closing member 30 will first be described with reference to FIG. 6.

Centrally with respect to the longitudinal axis 22, the second closing member 30 has a central portion 80, via which the second closing member 30 is assembled on the driving body 42. A plurality of recesses 82 (only two of which can be seen in FIG. 6), in this case three recesses, are distributed over the circumference on the central portion 80. These recesses 82 are used to receive and guide the respective ends 84 of the fingers 70 of the flow barrier element 58. Due to the fact that the ends 84 of the fingers 70 are received in the recesses 82, the flow barrier element 58 is arranged so as to be axially movable between the closing members 28 and 30, but secured against rotation in relation to the longitudinal axis 22.

A plurality of drainage openings 86 (of which only two can be seen in FIG. 6), in this case three drainage openings, are formed in the closing member 30 about the central portion 80 and transition into the leakage outlet 46 (see also FIGS. 1 and 2). The drainage openings 86 widen toward the leakage space 44 and are approximately kidney-shaped in cross section.

In the installed position of the flow barrier element 58 in the double seat valve 10, the apertures 68a in the axial annular body portion 66a and the apertures 68b in the axial annular body portion 66b are aligned with the drainage openings 86 in the closing member 30, as can best be seen in FIG. 2. More specifically, one of the apertures 68a and one of the apertures 68b is in each case aligned with one of the drainage openings 86.

The function of the flow barrier element 58 will now be described hereinafter.

In the closed position of the double seat valve 10, in which both closing members 28 and 30 are located in their closed position, as is shown in FIGS. 1 and 2, the flow barrier element 58 is located loosely between the two closing members 28 and 30 approximately in a central position, in which the radial annular body portion 62 leaves a gap between itself and the closing member 28 and between itself and the closing member 30. In the event of a leakage with failure of the seal 32 and/or of the seal 38, medium between the radial annular body portion 62 and the closing member 28 or the closing member 30 can thus reach the leakage space 44, and from there the leakage outlet 46 via the drainage openings 86, such that leakage detection is possible. Here, the leakage can enter the leakage space 44 through the apertures 68a or 68b, but may also pass the edges 66a and/or 66b via the recesses 74a and 74b respectively.

The flow barrier element 58 therefore does not impair the required possibility of leakage detection.

If the double seat valve 10 is transferred into its open position, the closing member 30 is moved upwardly toward the closing member 28 via the above-mentioned control mechanism 41, entraining the flow barrier element 58. Here, the closing member 30 seals with respect to the flow barrier element 58, for which purpose an axial seal 88 is provided in the radial annular body portion 62 of the flow barrier element 58. Here, the flow barrier element 58 in turn contacts the closing member 28 in a sealing manner, for which purpose a further axial seal 90 is provided in the closing member 28. In the open position of the double seat valve 10 shown in FIG. 3, the leakage space 44 is sealed against the interior of the valve housing portion 14, and therefore medium from the interior of the valve housing portion 14 can pass into the interior of the valve housing portion 16.

During lifting of the first closing member 28 in accordance with FIG. 7 for the purposes of cleaning the seal 32 and the closing member seat 34 as well as the leakage space 44, a pressurized cleaning medium is fed into the gap 54 between the closing member 28 and the closing member seat 34 via the interior of the valve housing portion 14.

In this operating state, the annular body 60 of the flow barrier element 58, together with the closing member 28, divides the leakage space 44 into a first leakage space portion 92 and a second leakage space portion 94. The pressurized cleaning medium fed through the gap 54 causes the flow barrier element 58 to be pushed axially in the direction toward the second closing member 30 until the edge 66a of the axial annular body portion 64a and the edge 76a of the recess 74a contact one another in a sealing manner, engaging one another from behind. The flow barrier element 58 is thus locked on the closing member 28. The radial seal 78 of the radial annular body portion 62 or, if no such seal is provided, merely the radial annular body portion 62, seal the first leakage space portion 92 with respect to a direct impingement of the seal 36 of the closing member 30 located in the closed position. The flow barrier element 58 thus ensures a shadowing or the avoidance of a direct impingement of the seal 36 with cleaning medium.

The pressurized cleaning medium enters the apertures 68a in the axial annular body portion 66a from the first leakage space portion 94, whereby the cleaning medium in the form of thin jets is directed directly into the drainage openings 86. Here, no overpressure builds up in the second leakage space portion 94. By contrast, the second leakage space portion 94 here is at atmospheric pressure, that is to say at the pressure prevailing at the end of the leakage outlet 46 into the surrounding environment, normally a pressure of approximately 1010 mbar. The fingers 70 of the flow barrier element 58 are offset with respect to the apertures 68a, such that they do not constitute an obstacle for the cleaning medium jets over their path into the drainage openings 86. The cleaning medium is strongly accelerated in the apertures 68a, which for example have a cross section of a few millimeters, for example 1 to 4 mm, such that the cleaning medium jets exiting from the apertures 68a act in the manner of a water aspirator. With measurements of the pressure in the region of the seal 36 of the second closing member 30, it has been found specifically that even a negative pressure, that is to say a pressure below atmospheric pressure, is present in the second leakage space portion 94a. Since the sealing element 38 is located in the second leakage space portion 94a, it is located in the pressure-free space.

In any case, the pressure in the second leakage space portion 94 is highly reduced compared to the pressure in the first leakage space portion 92. This allows the passage cross section 50 of the leakage outlet 46 to be much smaller than the cross section of the leakage space 44 itself, even directly after the leakage space 44, whereby the tubular continuation 48 of the closing member 30 can be manufactured in a material-saving manner with a smaller diameter, as has already been described above at the outset with reference to FIG. 1.

In the reverse case of lifting of the second closing member 30 in accordance with FIG. 8, the operating principle of the flow barrier element 58 is analogous. Pressurized cleaning medium is fed through the gap 56 between the second closing member 30 and the second closing member seat 38 for the purpose of cleaning the seal 36 and the closing member seat 38. In this case too, the annular body 60 of the flow barrier element 58 again divides the leakage space 44 into a first leakage space portion 92b and a second leakage space portion 94b, wherein the axial annular body portion 64b, together with the radial annular body portion 62 and the closing member 30, then delimits the first leakage space portion 92b. Due to the pressurized cleaning medium, the flow barrier element 58 is then pushed toward the first closing member 28, whereby the edge 66b of the axial annular body portion 64b contacts the edge 76b of the recess 74b in a sealing manner, said edges engaging one another from behind, and the flow barrier element 58 is locked on the closing member 30. The pressurized cleaning medium then passes through the apertures 68b in the axial annular body portion 66b and passes therefrom into the second leakage space portion 94b, and, due to the alignment of the apertures 68b pointing toward the drainage openings 86, the cleaning medium jets enter the drainage openings 86 directly. In this case too, the cleaning medium jets do not experience any obstacles, and the cleaning medium can flow in a pressure-free manner into the leakage outlet 46 via the drainage openings 86. In accordance with FIG. 8, the sealing element 32 is located in the second leakage space portion 94b and therefore in the pressure-free chamber.

Generally, the apertures 68a, 68b are dimensioned in cross section and/or in their number such that a pressure substantially equal to atmospheric pressure or even a negative pressure below atmospheric pressure prevails in the second leakage space portion 94a or 94b when the double seat valve 10 according to FIGS. 7 and 8 is subject to a cleaning process.

Figure 6:
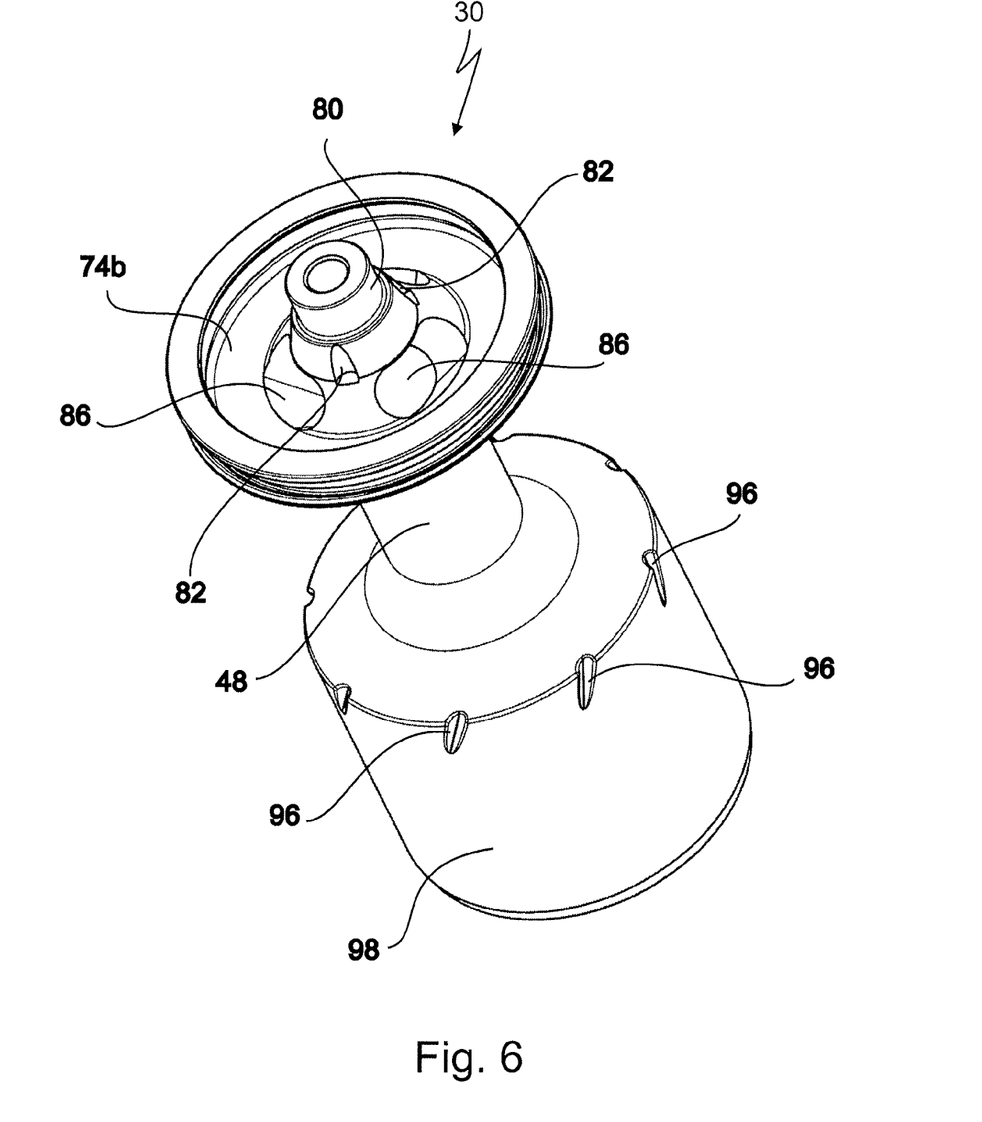
FIG. 6 shows a perspective illustration of a closing member of the double seat valve in FIG. 1 in isolation.

A further improvement of the cleaning capability of the double seat valve lies in the fact that, in accordance with FIG. 6, a plurality of recesses 96 are distributed circumferentially over the outer circumference on a closure part 98 of the second closing member 30. Specifically, the closure part 98 seals circumferentially with respect to a seal 100, and, since the double seat valve 10 is designed such that the second closing member 30 is moved axially upwardly in the open position, the closure part 98 has to be cleanable from the outside. The recesses 96 are used for this purpose. When lifting the second closing member 30, the recesses 96 come to rest at the height of the seal 100, whereby the cleaning medium can be conducted away downwardly through the recesses 96, past the seal 100. In the closed state of the closing member 30, the recesses 96 are located above the seal 100, and therefore the seal 100 and the closure part 98 are contacted in a sealing manner. The recesses 96 are oriented at a slight incline with respect to the longitudinal axis 22, whereby the flow of the cleaning medium is improved and a rinsing and cleaning of the closure part 98 over the entire circumference is ensured.

What is claimed is:

1. A double seat valve for separating media, comprising
a valve housing having connectors for a first pipeline and a second pipeline,
a first closing member, a first closing member seat, and at least one first sealing element,
a second closing member axially spaced from the first closing member, a second closing member seat axially spaced from the first closing member seat, and at least one second sealing element,
the first and second closing members being able to be lifted independently of one another from the first and second closing member seats,
a leakage space arranged between the first and second closing members and discharging into a leakage outlet,
a flow barrier element arranged between the first and second closing members for shadowing, when the first closing member is lifted, at least one of the second sealing element and the second closing member seat against direct impingement by a medium fed into the leakage space, and for shadowing, when the second closing member is lifted, at least one of the first sealing element and the first closing member seat against direct impingement by a medium fed into the leakage space,
the flow barrier element having an annular body, which divides, when one of the first and second closing members is lifted, together with said one of the first and second closing members the leakage space into a first leakage space portion and a second leakage space portion, the annular body being configured for a passage of medium through the annular body from the first leakage space portion into the second leakage space portion such that a second pressure in the second leakage space portion is reduced compared to a first pressure in the first leakage space portion, the medium reaching the leakage outlet from the second leakage space portion.

2. The double seat valve of claim 1, wherein, when medium passes from the first leakage space portion into the second leakage space portion, the second pressure in the second leakage space portion is reduced substantially to atmospheric pressure at the leakage outlet or even to a pressure below the atmospheric pressure.

3. The double seat valve of claim 1, wherein the annular body has a radially extending annular body portion and an adjoining axially extending annular body portion, wherein, when one of the first and second closing members is lifted and the first leakage space portion is impinged by medium, the axial annular body portion contacts said one of the first and second closing members in a sealing manner.

4. The double seat valve of claim 3, wherein the axial annular body portion and said one of the first and second closing members have mutual edges engaging one another from behind such that the axial annular body portion contacts said one of the first and second closing members in a sealing manner.

5. The double seat valve of claim 1, wherein the flow barrier element is arranged loosely between the first and second closing members and axially movably relative to the first and second closing members.

6. The double seat valve of claim 1, wherein the annular body of the flow barrier element has a plurality of apertures, through which, when one of the first and second closing members is lifted, medium can pass from the first leakage space portion into the second leakage space portion, wherein at least one of the number and individual cross sections of the apertures is dimensioned such that the pressure in the second leakage space portion is substantially at atmospheric pressure or below atmospheric pressure when medium passes through the apertures.

7. The double seat valve of claim 6, wherein at least one of the first and second closing members has at least one drainage opening connecting the leakage space to the leakage outlet, and wherein at least one of the apertures in the annular body of the flow barrier element is aligned with the at least one drainage opening.

8. The double seat valve of claim 7, wherein the at least one drainage opening widens toward the leakage space.

9. The double seat valve of claim 1, wherein the flow barrier element is arranged between the first and second closing members in a manner secured against rotation.

10. The double seat valve of claim 1, wherein the flow barrier element has a seal for bearing against an interior wall of the housing.

11. The double seat valve of claim 1, wherein the flow barrier element has a sliding element for bearing against an interior wall of the housing.

12. The double seat valve of claim 1, wherein the flow barrier element bears directly against the housing, without an additional seal or sliding element.

13. The double seat valve of claim 1, wherein the annular body of the flow barrier element is not in sealing contact with either of the first and second closing members in a closed position of both, the first and second closing members.

14. The double seat valve of claim 1, wherein the annular body of the flow barrier element contacts both, the first and second closing members in a sealing manner in an open position of both, the first and second closing members.

15. The double seat valve of claim 1, wherein at least the annular body of the flow barrier element is manufactured from a plastics material.

16. The double seat valve of claim 1, wherein at least the annular body of the flow barrier element is manufactured from polyether ether ketone (PEEK).

* * * * *